Mar. 5, 1929.　　　J. HARTNESS ET AL　　　1,703,933
OPTICAL COMPARATOR
Filed May 21, 1925　　　3 Sheets-Sheet 1
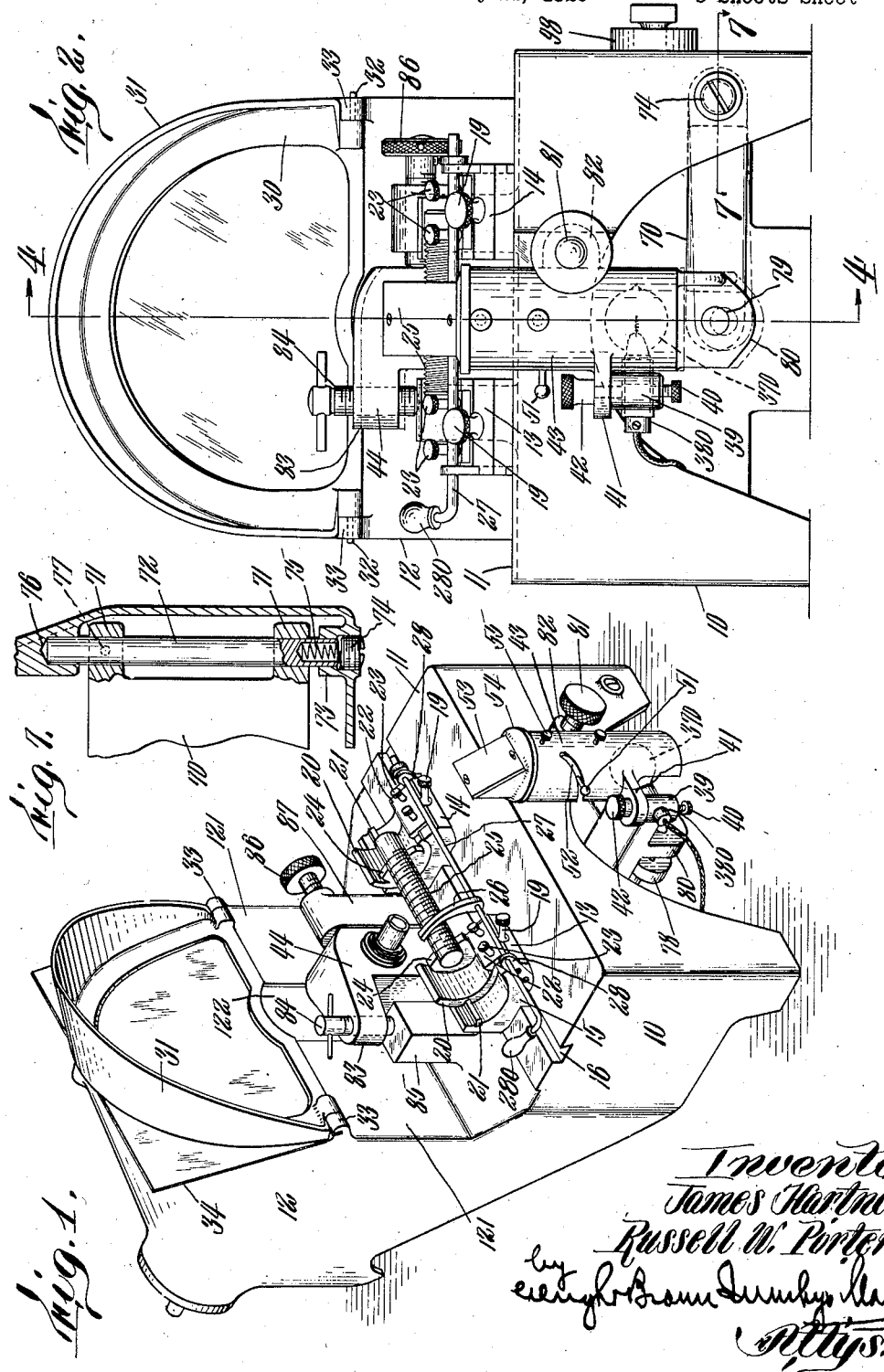
Inventors
James Hartness
Russell W. Porter

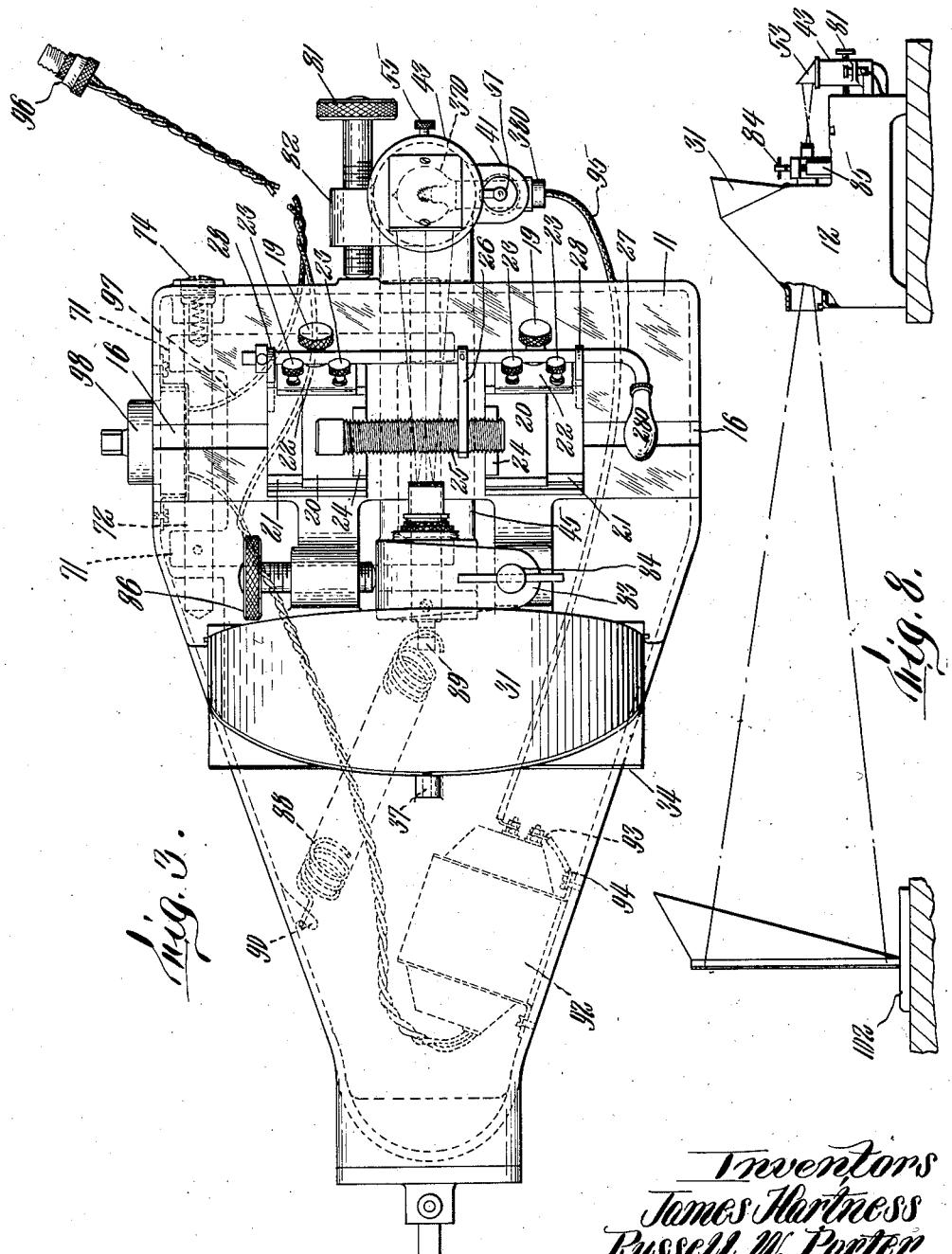

Mar. 5, 1929. J. HARTNESS ET AL 1,703,933
OPTICAL COMPARATOR
Filed May 21, 1925  3 Sheets-Sheet 3
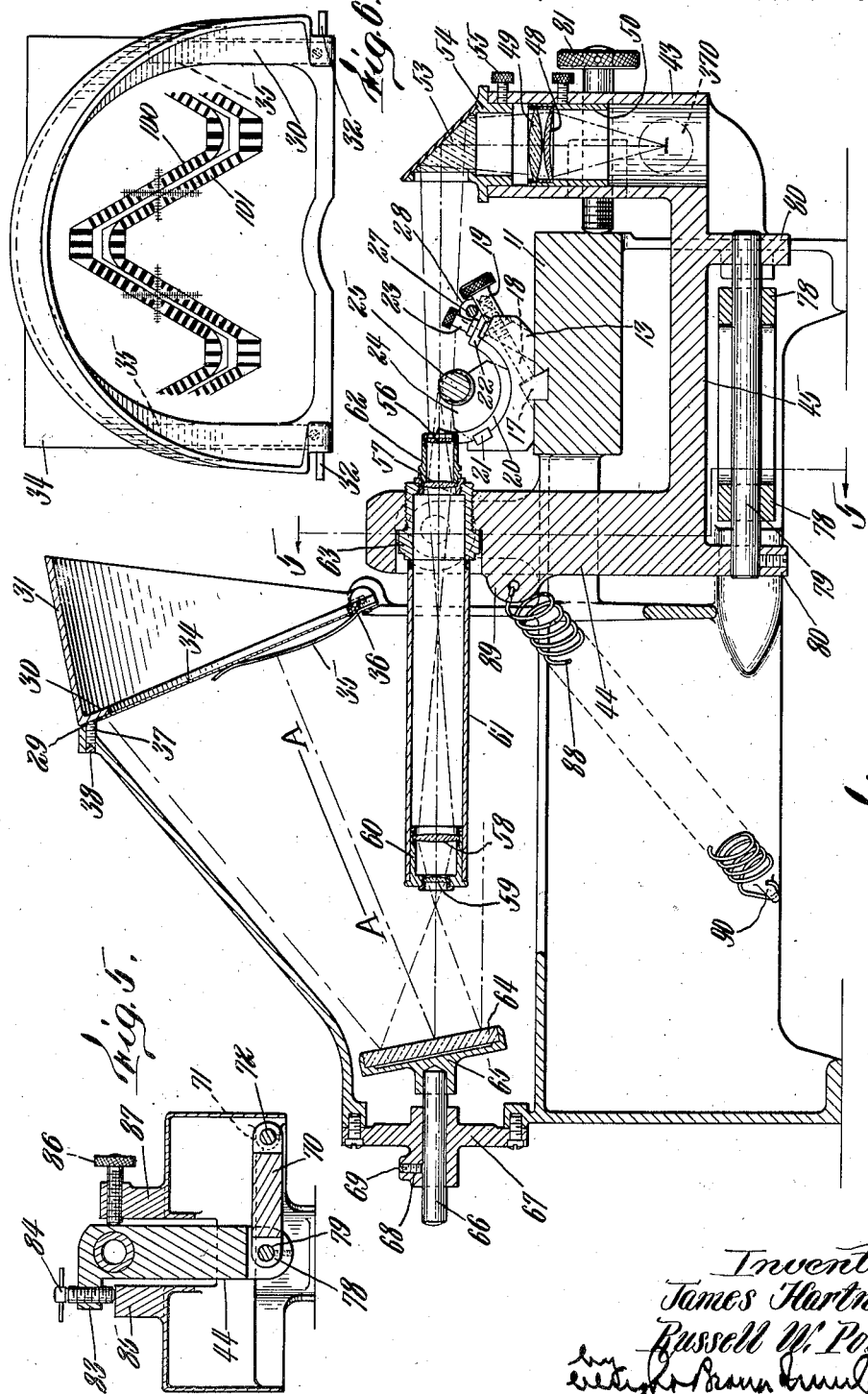
Inventors
James Hartness
Russell W. Porter Patented Mar. 5, 1929.

1,703,933

UNITED STATES PATENT OFFICE.

JAMES HARTNESS AND RUSSELL W. PORTER, OF SPRINGFIELD, VERMONT.

OPTICAL COMPARATOR.

Application filed May 21, 1925. Serial No. 31,746.

This invention has for its object an apparatus for inspecting and gaging screw-threaded elements by means of which one may detect deviations from a standard screw-threaded element in diameter, lead, form or profile of the thread as well as smoothness and density of the surface of the element being gaged or inspected. Another object of the invention is to provide such an apparatus or comparator of this character of relatively small size so that it may be placed upon a suitable work bench and employed under ordinary shop lighting conditions. Further objects of the invention are so to construct the apparatus that in the operation of gaging or inspecting the threaded element, the operator need face no light stronger than that which illuminates the chart upon which the image of the element being gaged is projected, and also to permit accurate adjustment of the several parts.

The manner in which these various objects are achieved, and an embodiment of the invention, are set forth and described in the following specification, together with a statement of the advantages flowing from the particular embodiment of the invention which has been selected for illustration on the accompanying drawings:—

Figure 1 represents in perspective view the comparator or thread-gaging device embodying the present invention.

Figure 2 represents the front elevation of same.

Figure 3 represents plan view of the comparator.

Figure 4 represents a section on the line 4—4 of Figure 2.

Figure 5 represents on a smaller scale a section on the line 5—5 of Figure 4.

Figure 6 represents the chart-holder with a tolerance chart in place thereof.

Figure 7 represents a section from the line 7—7 of Figure 2.

Figure 8 illustrates how the apparatus may be employed for projecting an image of the threaded element upon a chart relatively remote from the apparatus.

The apparatus which may be termed a comparator has a chart-holder upon which may be placed any one of a series of charts having marked or drawn thereon an enlarged thread with which the threaded element to be inspected may be compared by projecting an enlarged image of a portion of the threaded element upon the chart. The comparator is further provided with rests or cradles upon which the threaded element to be inspected may be placed, a source of light located below the horizontal plane of the cradles and an optical train for projecting the image of a portion of the threaded element upon the chart. Preferably the chart itself is translucent and located in substantially upright position above the optical train, the parts being all so arranged that the operator may stand in front of the apparatus and successively place the elements to be gaged upon the cradles and inspect and compare the enlarged images thereof with the standard thread upon the chart, all as will be more specifically described in detail.

The comparator which is illustrated upon the drawing comprises a cabinet 10 provided on its front portion with a stage or flat table 11 and with an upright rear portion 12. Upon the table 11 there is placed a support comprising the cradle-holders and cradles or rests upon which the threaded elements to be inspected and gaged may be supported. For this purpose we employ two carriages (or cradle-holders) indicated at 13 and 14, and inasmuch as these two are identical in construction, we will describe but one of them, the same reference characters, however, being applied to the respective parts of both. The carriage or cradle-holder 13 has a flat portion adapted to slide transversely of the machine on the table and provided with a tongue 15 fitting in an undercut groove or guideway 16, which extends transversely of the cabinet. Midway between its ends the table is provided with a small plug 17, which is complemental to the groove 16 and having a pin 18 which extends forwardly and upwardly through the carriage. A sleeve nut 19 having a knurled head is screwed upon the threaded end of the pin 18 so as to bear against a face formed on the front of the carriage. The plug 17, the pin 18, and the sleeve nut 19 afford means for locking the carriage in position after it has been adjusted. Upon the carriage is placed a cradle for the screw or other threaded element which is to be gaged. This support is preferably arcuate or semi-cylindrical in cross section and is located in a complemental concavity formed in the top of the carriage as indicated at 20. The carriage is formed or provided with a longitudinal tongue or a gib 21 which projects into a longitudinal groove formed in the cradle 20. A clamping member 22, having on its under surface ribs or flanges which engage the top of the cradle 20 and the carriage 13 is provided with apertures through which two knurl-headed set screws 23 are passed into a threaded engagement with the carriage. By setting the screws 23 the cradle 20 may be forced rotatively to bind it against the gib 21 and thus hold it against movement after it has once been adjusted to the desired position. The cradle 20 is provided with a flange 24 having a semi-cylindrical threaded recess adapted to engage the thread of a screw or other element to be engaged. It will be observed from Figure 4 that the cavity or socket in the carriage 13 and in the cradle flange 24 are all concentric with the axis of a perfect screw placed upon the cradle, and fitting on the threaded socket or cavity therein so that the slight rotative movement of the cradle in binding it in position after adjustment will not affect a lateral dislocation of a screw placed upon the cradle.

The two carriages are adjustable towards and from each other longitudinally of the screw to be gaged, such as that indicated at 25, and may be fixed in position after adjustment. The width of the table upon which the carriages are supported and the length of adjustment is such that screws of greatly differing lengths may be supported by the cradles. Cradles arranged to receive screws of different diameters are supplied with the comparator, and may be easily placed on the carriages as needed. In order that each screw may be held in position upon the cradles without danger of its dislocation during the operation of gaging it, we provide a movable finger 26 arranged to project rearwardly and rest upon the screw as best shown in Figure 1. This finger is secured upon a rod 27 slidably and rotatively mounted in bearing brackets 28 on the two carriages at the front lower portions thereof and is provided with a handle 280 by which it may be rocked to swing the finger 26 into and out of engagement with the screw 25. The rod 27 is of such length as not to interfere with the adjustment of the carriages and the cradles thereon towards and from each other.

This presser finger allows the screw to be rotated under pressure in the cradles, thus removing any foreign particles such as dust or dirt and firmly bedding the screw into a concentric position.

The rear portion 12 of the cabinet projects above the horizontal planes of the front portion and is hollow, and its top is in the shape of a forwardly and upwardly projecting hood which is partly closed by a wall 121, at the front. The upper portion has an opening defined by a flat rim 29 against which may rest a removable chart-holder 30. This chart-holder consists of a relatively thin, flat, hollow frame which is shown as substantially semi-circular and which rests against the rim 29 of the opening of the rear portion of the cabinet (which is slightly inclined rearwardly from the vertical), so that it is close to and may be conveniently seen by the operator standing in front of the apparatus. The chart-holder is provided with a forwardly projecting flange or hood 31 which operates as a light screen to prevent light from striking the chart from a source located laterally from or above the apparatus. The chart-holder is provided with pintles 32 as shown in Figure 6 which rest in open sockets 33 on the rear hooded portion 12 of the cabinet so that the chart-holder may be adjusted about the axis of the pintles to bring the plane of the chart normal to the axis (A—A) of the projected shadow and may be easily removed from the cabinet by lifting it in a direction slightly inclined from the vertical.

With the chart-holder we employ a plurality of what we term tolerance charts, one of which is indicated at 34. Each chart has indicated thereon at least one thread of a perfect or standard screw of a given gage and lead, as will subsequently be explained. Each chart may be separately placed in the chart-holder for use in engaging a plurality of screws supposed to be of the same character as to lead and diameter. These charts are preferably of some translucent material so that an image projected upon the rear face of the chart may be seen through it. For this purpose we may employ celluloid, heavy oiled paper or other suitable translucent material upon which an imprint or drawing may be made. Near its ends the chart-holder is provided with two spring members 35 between which and the chart-holder may be inserted one of the charts as shown in Figure 4. The lower edges of the chart rest upon a rib or shoulder 36 formed on the chart-holder. At the upper portion of the rim of the hooded end of the cabinet there is an adjusting screw 37 against which the chart and chart-holder rest. After the chart-holder has once been adjusted angularly about the axis of its pintles to the desired position, the threaded aperture through which the screw 37 is passed, is preferably filled with sealing wax or other suitable material, as indicated at 38, so as to prevent tampering with the screw.

Upon the chart 34 is cast or projected an enlarged image of at least one thread of a screw placed upon the cradles. To accomplish this, we employ a source of light indicated at 370 and an optical train such as we shall describe. We preferably employ as the source of light a small electric lamp bulb of say 21 to 32 candle-power, the stem of which is screwed in to a plug indicated at 380. The plug extends through a post 39 and is held adjustably in place therein by set screw 40. The post is secured to a laterally extending bracket 41 by means of a knurled screw 42. A lateral movement of the lamp shifts the incident beam laterally across the face of the microscope lens; a transverse movement of the lamp (by rotating the post 39) produces a vertical shift in the incident beam, the center of the condenser acting exactly like a universal pivot to the bundle of light rays. The bracket 41 projects laterally from an upright tube 43 (which may be termed the condenser tube) which lies immediately in front of the cabinet 10 and in which the lamp 370 is located. This tube serves not only to enclose a lamp or source of light but to support certain members of the optical system. It forms the front end of a yoke having a rear upright 44 on which other members of the optical train are supported, and a horizontal connecting web 45. The yoke is arranged longitudinally of the cabinet with the web 45 underneath the table 11, and the front and rear upright members 43 and 44 of the yoke projecting upwardly in the front and rear of the table. Thus upon this yoke are supported the members which constitute the optical system by which a greatly enlarged image of one of the threads of the screw 25 is projected upon the chart 34 for comparison with the imprint of a standard screw thereon.

It should be understood that we do not confine ourselves to the particular lenses or optical system which we have illustrated and shall now describe, as any suitable projecting optical system may be employed. As shown, however, this system comprises a condenser consisting of the two condensing lenses 48 and 49 supported by sleeve 50 arranged in the tubular holder 43. The sleeve 50 has a pin 51 projected radially outward through a helical slot 52 formed in the cylindrical wall of the tubular holder 43 so that by moving the pin in the slot, the sleeve 50 and the condensing lenses may be vertically adjusted, in order to diverge or converge the incident beam of light. At the upper end of the tubular-holder 43 there is located a prismatic reflector indicated as a whole at 53 by which the bundle of light rays emanating from the source of light may be reflected in a horizontal direction across one of the threads of the screw 25. The reflector is secured upon a flanged sleeve 54 set in the upper end of the tubular-holder 43 and held in place by a set screw 55, and the sleeve and the reflector may be rotatively adjusted above the optical axis of the lenses 48 and 49.

Upon the upright holder 44 of the yoke there is supported a horizontal tube having the optical train constituting the compound microscope by which a greatly enlarged image of the thread of the screw 25 may be projected upon the chart. As illustrated, four suitably ground lenses indicated at 56, 57, 58 and 59 may be utilized for this purpose. Those at 58 and 59 are arranged in a cap 60 located at the rear end of one section 61 of the tube while those at 56 and 57 are held in a section 62 of the tube, these two tube sections 61 and 62 being secured to an intermediate section 63, which is screwed into a suitable aperture formed in the upright holder 44; and the tube, as a whole, projects through a slot 122 formed in the front wall 121 of the hooded rear portion of the cabinet. The lenses 56 and 57 are of short focal length so that they may be brought into a position close to a thread on the screw 25. It will be observed that the tube which is placed upon the support 44 is substantially horizontal and extends below the chart 30 into the hooded portion of the cabinet. The bundle of light rays are reflected to the chart by a reflector indicated at 64 supported upon a holder 65 secured to a horizontal stud 66 whose axis is coincident with the optical axis of the tube 61 and which is mounted in a removable cap or circular plate 67. This plate normally closes an opening in the rear end of the hooded portion of the cabinet. The stud 66 is rotatively and longitudinally adjustable to produce the required magnification on the chart, and is secured after adjustment by set screw 68 which may be sealed after adjustment by sealing wax, as at 69, in the socket into which the set screw is passed.

By the construction thus described it will be observed that the source of light and the optical train which constitutes the projecting mechanism are all supported upon a member or yoke, and that the source of light is so located in a closed tubular holder at the front of the yoke that it is concealed from the sight of the operator, and is placed at the front of the instrument and below the operator in such position that there is no obstruction to prevent the easy insertion and removal of the screws upon and from the cradles, which are exposed from above.

The yoke itself is adjustable relatively to the table both vertically, horizontally and laterally so that the microscope may be properly focused and located in respect of a particular thread of the screw to be gaged and project a sharply defined image on the chart. For this purpose the yoke is supported upon a link 70 (see Figure 5) which at one end has ears 71 through which is passed a pintle 72 (see Figure 7) journaled in bearings in the cabinet. In one of these bearings as at 73 there is inserted a short screw 74 against which bears a spring 75 placed in a socket in the end of the pintle so as to force the other end of the pintle against the end of the bearing socket 76 and thus compensate for any wear in the end of the bearing socket 76 against which the pintle bears. One of the ears 71 is secured to the pintle by means of a set screw 77. The link 70 is also provided with ears 78 to receive a pintle 79 the ends of which are supported in ears 80 projecting downwardly from the horizontal web 45 of the yoke. The ears 80 embrace the link 70 but are so spaced as to permit an adjustment of the yoke longitudinally of the cabinet and securely transversely of the screw 25 upon the cradles. An adjusting or abutment screw 81, which may be termed the focusing screw, is passed through a laterally projecting ear or lug 82 on the tubular holder 43 and bears against the front face of the table 11, and by means of this screw the optical train holder or yoke may be adjusted in a horizontal direction and transversely of the screw 25 placed upon the cradle to focus the microscope portion of the optical train. For adjusting the yoke vertically, the upright holder 44 at the rear end thereof is provided with a laterally projecting lug 83 through which an adjusting screw 84 is passed to rest upon an abutment 85 on the cabinet, as best shown in Figures 1 and 5; and, for the purpose of swinging the yoke or optical trainholder about the axis of the pintle 79 and thus adjusting the yoke horizontally but lengthwise of a screw 25 upon the cradle, we employ an adjusting screw 86, which is passed laterally and transversely through an upright lug 87 on the cabinet and bears against the upright holder 44 near its upper end. By means of the three screws 81, 84 and 86, the yoke, and consequently the entire optical train, may be adjusted universally or in any direction to a limited extent in reference to the cradles which are supported by the stationary table 11. In order that the yoke or optical train support may be held at all times against the pressure of the screws 81, 84 and 86, we employ a fairly strong tension spring 88, one end of which is secured to a lug 89 on the upright support 44 of the yoke and its other end secured to a hook 90 at one side of the cabinet in the lower and rear portion thereof. This spring is arranged at such an inclination as shown in Figures 3 and 4 that the screw 81 is forced at all times upon the front of the table 11, the screw 84 is forced against the abutment 85, and the upright holder 44 of the yoke is forced against the screw 86; consequently, when any one of these screws is rotated in one direction or the other, there is a corresponding adjustment of the yoke and consequently of the optical train in relation to the cradles or a screw placed thereon.

Inasmuch as the ordinary factory is provided with a relatively high voltage electric circuit of, say, 110 volts or more, and we preferably employ a small lighting bulb which requires about 6 to 8 volts for its operation, we usually provide the apparatus with a small transformer to which conductors from the usual lighting circuit of the factory may be connected. This transformer is indicated in dotted lines, Figure 3 at 92, and may be of any suitable kind or type. One of the low tension terminals 93 of the transformer is grounded to the metal cabinet as indicated at 94 and the other is connected by conductor 95 with the plug 380 in which the socket for the electric lamp 370 is inserted. One of the electrodes of the socket is likewise grounded to the frame. For conveying the high voltage current to the transformer, we may employ the usual plug 96 which may be screwed into an electric light socket, one of the conductors 97 being connected through a suitable switch indicated at 98 and located at one side of the cabinet. This switch, which is preferably of the rotary-snap type, is at the side of and near the front of the cabinet, so that it is within convenient access to an operator standing in front of the cabinet.

Referring once more to what we have termed the tolerance chart 34, as illustrated in Figure 6, the two heavy block broken lines 100, 101, indicate the permissive tolerance or variation of each thread, the image of which, when projected from the thread of the screw on the cradle, should fall within the space between the block lines 100, 101. While of course the enlargement of the projected thread of the screw 25 may be of any order or magnitude, we find it convenient to enlarge the image, say, fifty times.

In using the comparator one of the carriages is fixed in position so that its cradle is at a point laterally remote from the optical axis of the microscope tube 61, and with the other carriage loosely so adjusted that its cradle will support a screw resting upon the cradle of the first mentioned carriage. A perfect or master screw is then placed upon the cradles, one of which is adjusted so that the horizontal distance from the cradle to the thread projected equals the length of engagement desired. Then a chart having an enlarged print or drawing corresponding to the master screw is placed in the chart-holder, and the chart and the optical train are adjusted until a sharply defined projected image of one of the threads of the master screw remote from the fixed cradle registers with the upper outlined thread on the chart. This may require some adjustment of the yoke or optical train support. Then the screws to be gaged are placed one after another upon the cradles. As previously stated, one of the cradles remains fixed, but the other may be adjusted to compensate for variations in the lead of the screw being gaged. When the image of the screw upon the cradle is projected upon the chart, if the screw be perfect in lead, diameter and contour or profile, the projected image of the thread will duplicate the shadow of the master screw thread and fall within the boundaries of tolerance shown upon the chart; but if any one of these factors should deviate from those of a perfect screw, such deviation will be apparent at once for the reason that the projected image of the screw will not duplicate the shadow of the master and may or may not fall within the boundaries of tolerance indicated upon the chart. Inasmuch as any deviation or error is greatly magnified or enlarged in the image projected upon the screen, the operation of gaging the screws and separating those which are imperfect from those which are perfect is accomplished with great rapidity and accuracy. In adjusting the instrument the optical train may be properly focused by the adjusting screw 81. After the lamp has been so adjusted that the beam of light emerging from the prismatic reflector 53 just fills the lenses of the microscope tube 61, by means of screws 84 and 86, the yoke may be adjusted until the image of the master screw appears in proper position upon the tolerance chart. By slightly and rotatively adjusting the holder for the prismatic reflector 53, the beam of light may be brought parallel with the helix of the thread of the master screw, thus assuring the best condition of illumination for sharp definition.

Instead of having the chart-holder in the position in the cabinet as shown in Figures 1 and 4, it may, if desired, be removed therefrom and placed at a proper distance from the cabinet on a suitable holder as indicated conventionally at 102 in Figure 8. When this is done, the cap 67 and the reflector 64, which it supports, are removed from the apparatus so that the bundle of rays of light will pass through the opening in the rear end of the cabinet. This may be accomplished when it is desired to increase the enlargement or magnification of the image of the screw being gaged, beyond that permitted when the chart-holder is located in its usual position as shown in Figure 4.

One of the advantages of the embodiment of the invention, as herein illustrated and described, is the compactness, simplicity and ruggedness of the instrument, its small size, and the accessibility of the moving parts. The lamp and the optical system are supported upon a single adjustable support, shown and described as a yoke, which is capable of universal adjustment. The lamp is enclosed in the condenser tube, so that it is concealed from the sight of the operator, the prismatic reflector closing the upper end of the tube. Both the lamp and the condensing lenses are independently adjustable relatively to each other and to the prismatic reflector, and the latter is independently rotatively adjustable to vary the angularity of the bundle of light rays. The cabinet is closed in the rear of the chart-holder, so that light is excluded, except that coming from the projection lamp, and as stated, the chart-holder has a forwardly projecting hood, which prevents light coming from the side or top of the instrument from striking directly on the chart. The whole instrument is of such simplicity of construction, the parts are so easy to adjust and adjusting elements are so easy of access, that it may be used by an operator having no technical knowledge.

In using the terms "upright", "vertical", "horizontal" and the like, as herein employed, it will be understood that they are used in a relative sense unless the context requires a more specific meaning. In referring to the part, on which all of the other parts of the instrument are supported, as a cabinet, it will be understood that any other suitable frame of desired design may be employd, and that the term is used generically to indicate any supporting member having the shape necessary to permit it to perform its desired functions. It will further be understood that the phraseology which we employ herein is for purposes of description and not of limitation and that the invention may be embodied in other forms of optical comparator without departing from the spirit thereof.

In referring to the gaging of "screws", we mean of course to include any threaded members, such as taps, bolts and the like. And while we prefer to employ two cradles movable toward and from each other and adapted to receive a screw and to support it at spaced points along its length, the cradles may be made in any other suitable form, on which the screw to be gaged may be supported. Likewise, although to shorten the effective length of the instrument, the condenser tube, which encloses the condenser lenses and the source of light, is prferably arranged upright with a reflector at the upper end thereof, we would not regard it as a departure from the spirit of the invention if this condenser tube were aligned with the objective, and the reflctor were omitted, so far as other features of the invention are concerned, in which case the condensing lenses would be of shorter focal length.

Having thus explained the nature of the invention and having illustrated and described one embodiment thereof, without attempting to explain all the possible forms in which it may be made or all of the modes of its use, what we claim is:—

1. An optical comparator for gaging screws comprising a support on which a screw to be gaged may be placed in horizontal position, a chart-holder arranged above the horizontal plane of the screw-holder and in relatively close proximity thereto, a source of light below the horizontal plane of the screw-holder, and means including reflectors between the screw support and the chart-holder and the screw support and the source of light for projecting an enlarged image of such screw upon a chart located on the chart-holder.

2. An optical comparator for gaging screws comprising a support on which the screw to be gaged may rest, an approximately vertical chart above the screw support, and in relatively close proximity thereto, a source of light in front of and below the support, and means between the source of light and the chart for projecting an enlarged image of a screw on said support upon said chart.

3. An optical comparator for gaging screws comprising a chart, a support for the screw to be gaged, a lamp and an optical train for projecting an image of the screw upon the chart, and adjustable means for supporting said lamp and optical train and translationally adjusting them bodily as a unit relatively to the screw support.

4. An optical comparator for gaging screws, comprising a stage on which the screw to be gaged may be supported, an adjustable support, a lamp and a condenser on said support in front of said stage, a microscope on said support in the rear of said stage, a chart arranged to receive the projected image, and means for adjusting said support relatively to said stage, whereby said lamp, condenser and miscrope may be moved as a unit relatively to the stage, said microscope being thereby movable in any direction without altering the direction of the optical axis thereof.

5. An optical comparator for gaging screws, comprising a stage on which the screw to be gaged may be placed, an upright chart-holder, and means for projecting an image of such screw upon a chart placed on such holder including a substantially upright condenser tube, in front of the stage, enclosing condensing lenses and a source of light and having a reflector for reflecting the light substantially horizontally across such screw and a substantially horizontal microscope in the rear of such stage, for enlarging the projected image of the screw upon the chart.

6. An optical comparator for gaging screws comprising a cabinet having a stage to support a screw to be gaged and having in the rear thereof a hooded portion open at the front, a chart located across the front opening, a reflector located within the cabinet in the rear of the chart, and means for projecting an enlarged image of the screw upon such chart comprising a lamp and a condenser in front of the stage and a microscope in the rear thereof in optical relation to the condenser and the said reflector.

7. An optical comparator for gaging screws comprising a cabinet having at its front a stage with a free space thereabove for the easy placement and removal of screws on and from the stage, said cabinet having at its rear a hooded portion with a front opening above the stage, a translucent chart across said opening, and projecting means, including a source of light in front of the stage and a reflector in the rear of the stage and in the hood portion of said cabinet, for projecting on to said chart an enlarged image of screw supported on said stage.

8. An optical comparator for gaging screws comprising a cabinet having at its front a stage and at its rear a hooded portion with an opening above the stage, a reflector in the hooded portion, a translucent chart across said opening, an upright condenser tube, at the front of said cabinet, containing a source of light and condenser lenses, a reflector in optical relation to said condenser lenses and the first-mentioned reflector, a substantially horizontally arranged projector between said reflectors, and means on said stage for holding a screw with its threaded periphery in the optical axis of said projector.

9. An optical comparator for gaging screws, comprising a cabinet having a stage at its front portion and in the rear a closed hooded portion with a front opening, above the stage, a translucent chart across said opening, means on said stage, accessible from above, on which a screw to be gaged may be placed, a source of light and a condenser in front of said stage, a microscope in rear of said stage, and a reflector between said microscope and said chart.

10. An optical comparator for gaging screws comprising a cabinet, having a transverse stage, means thereon and accessible from above to permit the placing of a screw to be gaged thereon, a chart located above the said screw-supporting means and in relatively close proximity thereto, an adjustable member supported by said cabinet, and optical projecting means on said member for projecting an enlarged image of said screw on said chart, including a reflector in the rear of said chart.

11. An optical comparator for gaging screws comprising a cabinet having a stage, cradles thereon to support a screw and accessible from above, a chart, and optical means for projecting an enlarged image of such screw on said chart, including a closed condenser tube enclosing a source of light and condensing lenses and arranged in front of said cradles, a microscope in the rear of said cradles, and means supporting said condenser tube and microscope and adjustable with said tube and microscope to move said microscope in any direction.

12. An optical comparator for gaging screws comprising a cabinet having a stage, cradles thereon to support a screw and accessible from above, a chart, and optical means for projecting an enlarged image of such screw on said chart, including an upright condenser tube enclosing condensing lenses with a source of light below said lenses, a reflector directly above said tube for directing the light rays horizontally across said stage and the screw thereon, and a horizontally arranged microscope in the rear of said cradles in optical relation to said reflector.

13. An optical comparator for gaging screws comprising a cabinet having a transverse stage, and a closed rear portion with an opening above and in proximity to the stage; a translucent chart across said opening; an optical projecting and magnifying train arranged partly in front and partly in the rear of said stage, and including a reflector between the microscope thereof and the chart; and a source of light for said optical projecting train.

14. An optical comparator for gaging screws comprising a cabinet having a transverse stage, and a closed rear portion with a front opening above the stage; an inclined translucent chart across said opening; a support on said stage for the screw to be gaged and accessible to an operator standing in front of the comparator; an optical projecting and magnifying train including an upright condenser in front of said screw support, a substantially horizontal microscope in the rear of said screw support, a reflector between the condenser and the microscope, and a reflector between the microscope and said chart; and a source of light beneath said condenser.

15. An optical comparator for gaging screws comprising a cabinet having a transverse stage, and a closed rear portion with a front opening above the stage; an inclined translucent chart across said opening; a support on said stage for the screw to be gaged and accessible to an operator standing in front of the comparator; an optical projecting and magnifying train including an upright condenser in front of said screw support, a substantially horizontal microscope in the rear of said screw support, a reflector between the condenser and the microscope, and a reflector between the microscope and said chart; a source of light beneath said condenser; and means supporting said condenser and microscope and bodily adjustable to focus the microscope in reference to a screw on said screw support.

16. An optical comparator for gaging screws comprising a cabinet having a transverse stage, and a closed rear portion with a front opening above the stage; an inclined translucent chart across said opening; a support on said stage for the screw to be gaged and accessible to an operator standing in front of the comparator; an optical projecting and magnifying train including an upright condenser in front of said screw support, a substantially horizontal microscope in the rear of said screw support, a reflector between the condenser and the microscope, and a reflector between the microscope and said chart; a source of light beneath said condenser; and a yoke supporting the condenser and microscope and mounted on said cabinet to be universally movable in respect of said stage and screw support.

17. In an optical comparator, a cabinet having a stage at its front with a free space thereabove so that screws may be placed on and removed from the stage, and a closed rear end having a front opening above the stage, a chart-holder at said opening having provisions for detachably receiving a chart, and means for projecting upon said chart the enlarged image of a screw on said stage.

18. In an optical comparator, a cabinet having a screw supporting stage with a free space thereabove to facilitate the placement of screws on and their removal from said stage; a chart; a source of light and optical projecting means for projecting an enlarged image of such screw upon the chart including a microscope, a condenser at an angle thereto, and a reflector adjustable about the optical axis and located between the condenser and the microscope.

19. In an optical comparator, a cabinet having a screw supporting stage; a chart; a yoke having a horizontal member and substantially upright members respectively located in front and in rear of said stage; an optical projecting train including a condenser supported on the front upright member of said yoke and a microscope supported on the rear upright member of said yoke, and means for adjustably supporting said yoke on said cabinet whereby said microscope may be adjustably moved in any desired direction without change of direction of its axis.

20. In an optical comparator, a cabinet having a screw supporting stage; a chart; a yoke having a horizontal member and substantially upright members extending upwardly therefrom and respectively located in front and in rear of said stage; means for adjustably supporting said yoke on said cabinet; an optical projecting and magnifying train including an upright condenser supported on the front upright member of said yoke and a microscope supported on the rear upright member of said yoke; and a source of light also supported by said front upright member of the yoke.

21. In an optical comparator, characterized by having a chart and an optical projecting train for projecting an enlarged image of a screw upon such chart, a cabinet having a transverse stage, carriages movable along said stage, and having semi-cylindrical sockets, and cradles thereon complemental to such sockets for supporting a screw concentrically with said sockets.

22. In an optical comparator, characterized by having a chart and an optical projecting train for projecting an enlarged image of a screw upon such chart, a cabinet having a transverse stage, carriages movable along said stage, cradles on said carriages, and movable means for engaging a screw located on said cradles and holding it in place thereon.

23. In an optical comparator, characterized by having a chart and an optical projecting train for projecting an enlarged image of a screw upon such chart, a cabinet having a stage on which the screw to be gaged may be supported; a yoke having a web under the stage and having upright members respectively in front and in rear of said stage; a link pivoted to said cabinet and to said yoke; abutment screws respectively arranged longitudinally transversely and upright and respectively engaged with said yoke and said cabinet to impart a universal adjustment to said yoke; and an optical projection and magnifying train supported by the upright members of said yoke.

24. In an optical comparator, characterized by having a chart and an optical projecting train for projecting an enlarged image of a screw upon such chart, a cabinet having a stage on which the screw to be engaged may be supported; a yoke having a web under the stage and having upright members respectively in front and in rear of said stage; a link pivoted to said cabinet and to said yoke; abutment screws respectively arranged longitudinally transversely and upright and respectively engaged with said yoke and said cabinet to impart a universal adjustment to said yoke; a spring connected to said yoke and said cabinet to maintain the engagement of said screws with said cabinet or yoke; and an optical projecting train supported by the upright members of said yoke.

25. In an optical comparator, a cabinet having a stage to support a screw to be gaged, an optical projecting means for projecting an enlarged image of such screw, a chart on which such image may be projected, and a chart-holder mounted on the cabinet and having a flange which constitutes a hood or shield, and also having means for permitting the introduction and removal of a chart.

26. In an optical comparator, a cabinet having means for supporting a screw to be gaged, a chart to receive an enlarged image of such screw, and an optical projecting and magnifying train including a microscope, an upright condenser tube having a sleeve therein, condensing lenses supported by said sleeve, a reflector closing the upper end of said tube, and a source of light in the lower portion of said tube.

27. In an optical comparator, a cabinet having means for supporting a screw to be gaged, a chart to receive an enlarged image of such screw, and an optical projecting and magnifying train including a microscope, an upright condenser tube having a sleeve therein, condensing lenses supported by said sleeve, and a reflector closing the upper end of said tube, a source of light in the lower portion of said tube, and means by which said sleeve may be adjusted relatively to said reflector and said source of light.

28. In an optical comparator for gaging screws, a cabinet having a stage on which a horizontally arranged screw may be supported, a translucent chart arranged above the stage in approximately upright position, a reflector in the rear of and below the chart, a source of light in front of and below the stage, an upright condenser above the source of light, a horizontal microscope below the chart and above the stage, and a reflector above the condenser and in front of the stage, all so arranged in optical relation that an enlarged image of said screw supported on said stage may be projected on said chart.

In testimony whereof we have affixed our signatures.

JAMES HARTNESS.
RUSSELL W. PORTER.